UNITED STATES PATENT OFFICE.

EMIL BERINGER AND WILHELM ZIMMER, OF CHARLOTTENBURG, GERMANY, ASSIGNORS TO THE FIRM OF REICHHOLD, FLÜGGER & BOECKING, LAC-VARNISH MANUFACTURERS, OF HAMBURG, GERMANY.

PROCESS OF PRESERVING WOOD-OIL FROM CONGEALING ON BEING SUBJECTED TO HEAT.

1,103,473.     Specification of Letters Patent.     Patented July 14, 1914.

No Drawing.     Application filed September 23, 1913. Serial No. 791,317.

*To all whom it may concern:*

Be it known that we, EMIL BERINGER, a subject of the King of Prussia, residing at No. 18 Sophienstrasse, Charlottenburg, in the Kingdom of Prussia, German Empire, and WILHELM ZIMMER, a subject of the King of Prussia, residing at No. 3 Marchstrasse, Charlottenburg, in the Kingdom of Prussia, German Empire, have invented a new and useful Process of Preserving Wood-Oil from Congealing on Being Subjected to Heat, of which the following is a specification.

As is fully known this objectionable tendency to congeal on heating is a bar in boiling wood oil down to a faultless boiled oil. Those processes recommending an admixture of lime, alkali, alkaline carbonate, or zinc-dust produce no satisfactory results.

Now, we have made the surprising discovery that an addition of selenium, or sulfur, selenids, or sulfids, neutralizes the tendency to congeal, no matter whether low or high temperatures, exceeding 300° C. considerably, are applied. Surprising too is the small percentage of selenium or sulfur required to preserve the wood oil from congealing in the process of heating.

Through our new process wood oil may now be applied to a far greater extent than hitherto, in all those industries using varnish, boiled oil, etc., all the more so, because wood oil as compared with linseed oil and the like is more suitable in many cases; to this must be added the fact that varnishes produced with wood oil treated in accordance with our new invention are waterproof to an unparalleled degree, and are not liable to harden into tough surfaces when subjected to air.

*I. Recipe.*—To 100 kilograms of wood oil 20 to 50 grams of selenium are gradually added while the oil is being stirred; it is preferable to previously triturate the selenium with a small quantity of wood oil or any other oil. The temperature may then be increased up to from 250° to 300° C. At 250° C. the reaction starts, manifesting itself through a formation of foam. After half an hour's time, foaming diminishes: the conversion is finished. On being cooled a product of a beautiful yellow color, and the consistency of honey, is obtained. The conversion apparently is a polymerization since the isolated fatty acids have a melting point considerably higher than the melting point of the fatty acids obtained from untreated oil.

*II. Recipe.*—To 100 kilograms of wood oil from 60 to 120 grams of sulfur are added as described in the I. Recipe. This oil may, as a matter of course, be converted into lac-varnish by addition of resins in the same operation. If selenids or sulfids are employed larger quantities must be used.

We wish it to be understood, that for the purposes of this invention, sulfids, selenium and selenids are to be considered equivalents of sulfur.

We claim:

The process of converting wood oil into an oil not congealing on being subjected to heat, which consists in adding to the wood oil a very small quantity of sulfur, substantially as herein described.

EMIL BERINGER.
                WILHELM ZIMMER.

Witnesses:
    WOLDEMAR HAUPT,
    HENRY HASPER.